(12) United States Patent
Falconer et al.

(10) Patent No.: US 8,503,678 B2
(45) Date of Patent: Aug. 6, 2013

(54) SUPPRESSING POWER SUPPLY NOISE USING DATA SCRAMBLING IN DOUBLE DATA RATE MEMORY SYSTEMS

(75) Inventors: Maynard C. Falconer, Portland, OR (US); Christopher P. Mozak, Beaverton, OR (US); Adam J. Norman, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 480 days.

(21) Appl. No.: 12/646,823

(22) Filed: Dec. 23, 2009

(65) Prior Publication Data

US 2010/0153699 A1 Jun. 17, 2010

Related U.S. Application Data

(63) Continuation-in-part of application No. 11/864,141, filed on Sep. 28, 2007, now Pat. No. 7,945,050.

(51) Int. Cl.
*G06F 21/00* (2006.01)

(52) U.S. Cl.
USPC .............................................. 380/268; 713/2

(58) Field of Classification Search
USPC ............................................. 713/2; 380/268
See application file for complete search history.

(56) References Cited

U.S. PATENT DOCUMENTS

| 5,412,665 | A | 5/1995 | Gruodis et al. |
| 6,240,432 | B1 | 5/2001 | Chuang et al. |
| 6,640,236 | B1 | 10/2003 | Lupin et al. |
| 7,793,195 | B1 | 9/2010 | Wu |
| 7,843,926 | B1 | 11/2010 | Muller et al. |
| 2002/0120897 | A1* | 8/2002 | Eby ................................ 714/738 |
| 2003/0048903 | A1 | 3/2003 | Ito et al. |
| 2003/0188176 | A1* | 10/2003 | Abbondanzio et al. ........ 713/191 |
| 2004/0111663 | A1 | 6/2004 | Lewis |
| 2006/0041800 | A1 | 2/2006 | Johnson |
| 2006/0085710 | A1 | 4/2006 | Spica et al. |
| 2006/0281425 | A1* | 12/2006 | Jungerman ................. 455/183.2 |

(Continued)

FOREIGN PATENT DOCUMENTS

| DE | 112004000821 T5 | 5/2006 |
| EP | 1069497 | 2/2005 |

(Continued)

OTHER PUBLICATIONS

First Office Action mailed Feb. 12, 2011 for Chinese Patent Application No. 200810188780.1.

(Continued)

*Primary Examiner* — Gilberto Barron, Jr.
*Assistant Examiner* — Devin Almeida
(74) *Attorney, Agent, or Firm* — Blakely, Sokoloff, Taylor & Zafman LLP

(57) ABSTRACT

Embodiments are generally directed to systems, methods, and apparatuses for suppressing power supply noise using data scrambling in double data rate memory systems. In some embodiments, an integrated circuit includes a transmit data path to transmit data to one or more memory devices. The transmit data path may include scrambling logic to generate, in parallel, N pseudo random outputs that are uncorrelated with each other. The output data and the pseudo random outputs are input to XOR logic. The transmit data path transmits the output the of XOR logic which has a substantially white frequency spectrum. Other embodiments are described and claimed.

17 Claims, 9 Drawing Sheets

U.S. PATENT DOCUMENTS

| | | | |
|---|---|---|---|
| 2007/0270902 A1* | 11/2007 | Slazas et al. | 606/200 |
| 2007/0290902 A1 | 12/2007 | Bae et al. | |
| 2009/0086972 A1 | 4/2009 | Mozak | |
| 2010/0153699 A1 | 6/2010 | Falconer et al. | |

FOREIGN PATENT DOCUMENTS

| | | |
|---|---|---|
| JP | 08050562 | 2/1996 |
| JP | 2008217857 | 9/2008 |
| WO | WO-03083862 | 10/2003 |

OTHER PUBLICATIONS

Non-Final Office Action mailed Aug. 20, 2010 for U.S. Appl. No. 11/864,141.

Notice of Allowance mailed Jan. 6, 2011 for U.S. Appl. No. 11/864,141.

GB PTO, "First Office Action", UK Application No. 0817778.4 , Mailed Jan. 30, 2009, Whole Document.

Mozak, "Pending U.S. Appl. No. 11/864,141, filed Sep. 28, 2007", 26 pgs.

"Office Action for Chinese Patent Application No. 200810188780.1", (Sep. 7, 2011), Whole Document.

"Office Action for German Patent Application No. 10 2008 048 941.7-55,", (Jul. 4, 2011), Whole Document.

"Office Action for Japanese Patent Application No. 2008-248769", (Sep. 6, 2011), Whole Document.

"Office Action for U.S. Appl. No. 13/072,026", (Mar. 5, 2012), Whole Document.

* cited by examiner

Polynomial: $X^{16} + X^{13} + X^{10} + X^9 + X^8 + X^4 + 1$

| INPUTs | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 0 | 1 | 0 | 0 | 1 | 0 | 0 | 1 | 1 | 1 | 0 | 0 | 1 | 0 | 0 | 0 |
| 1 | 1 | 0 | 1 | 0 | 0 | 1 | 0 | 0 | 1 | 1 | 1 | 0 | 0 | 1 | 0 | 0 |
| 2 | 0 | 0 | 0 | 1 | 0 | 0 | 1 | 0 | 0 | 1 | 1 | 1 | 0 | 0 | 1 | 0 |
| 3 | 0 | 0 | 0 | 0 | 1 | 0 | 0 | 1 | 0 | 0 | 1 | 1 | 1 | 0 | 0 | 1 |
| 4 | 1 | 0 | 0 | 0 | 0 | 1 | 0 | 0 | 1 | 0 | 0 | 1 | 1 | 1 | 0 | 0 |
| 5 | 0 | 1 | 0 | 0 | 0 | 0 | 1 | 0 | 0 | 1 | 0 | 0 | 1 | 1 | 1 | 0 |
| 6 | 0 | 0 | 1 | 0 | 0 | 0 | 0 | 1 | 0 | 0 | 1 | 0 | 0 | 1 | 1 | 1 |
| 7 | 0 | 0 | 0 | 1 | 0 | 0 | 0 | 0 | 1 | 0 | 0 | 1 | 0 | 0 | 1 | 1 |
| 8 | 0 | 0 | 0 | 0 | 1 | 0 | 0 | 0 | 0 | 1 | 0 | 0 | 1 | 0 | 0 | 1 |
| 9 | 1 | 0 | 0 | 0 | 0 | 1 | 0 | 0 | 0 | 0 | 1 | 0 | 0 | 1 | 0 | 0 |
| A | 1 | 1 | 0 | 0 | 0 | 0 | 1 | 0 | 0 | 0 | 0 | 1 | 0 | 0 | 1 | 0 |
| B | 0 | 1 | 1 | 0 | 0 | 0 | 0 | 1 | 0 | 0 | 0 | 0 | 1 | 0 | 0 | 1 |
| C | 1 | 0 | 1 | 1 | 0 | 0 | 0 | 0 | 1 | 0 | 0 | 0 | 0 | 1 | 0 | 0 |
| D | 1 | 1 | 0 | 1 | 1 | 0 | 0 | 0 | 0 | 1 | 0 | 0 | 0 | 0 | 1 | 0 |
| E | 0 | 1 | 1 | 0 | 1 | 1 | 0 | 0 | 0 | 0 | 1 | 0 | 0 | 0 | 0 | 1 |
| F | 0 | 0 | 1 | 1 | 0 | 1 | 1 | 0 | 0 | 0 | 0 | 1 | 0 | 0 | 0 | 0 |

EX: Logic for calculating LFSR Output in cycle N+1 based on cycle N
$Out_{N+1}[2] = Out_N[2] + Out_N[5] + Out_N[8] + Out_N[9] + Out_N[A] + Out_N[E]$

SUPPRESSING POWER SUPPLY NOISE USING DATA SCRAMBLING IN DOUBLE DATA RATE MEMORY SYSTEMS

RELATED APPLICATIONS

The present application is a continuation-in-part of U.S. application Ser. No. 11/864,141 entitled "Suppressing Power Supply Noise Using Data Scrambling in Double Data Rate Memory Systems" by Christopher P. Mozak, filed on Sep. 28, 2007 now U.S. Pat. No 7,945,050.

TECHNICAL FIELD

Embodiments generally relate to the field of integrated circuits and, more particularly, to systems, methods and apparatuses for suppressing power supply noise using data scrambling in double data rate memory systems.

BACKGROUND

Memory systems are frequently defined by specifications such as the DDR (double data rate) Specification. The "DDR Specification" refers to any of the specifications that define DDR technology including, for example, The DDR2 Specification published by the Joint Electron Device Engineering Council (JEDEC). The DDR Specification calls for very tight jitter and timing specifications. Meeting these jitter and timing specifications is becoming more difficult because the IO (input/output) frequencies of DDR memory systems is increasing. The majority of the jitter and timing error is due to power supply noise.

BRIEF DESCRIPTION OF THE DRAWINGS

Embodiments are illustrated by way of example, and not by way of limitation, in the figures of the accompanying drawings in which like reference numerals refer to similar elements.

FIG. 4 is a conceptual diagram illustrating select aspects of a scrambling process based on a linear feedback shift register implemented according to an embodiment.

DETAILED DESCRIPTION

Figure 1:
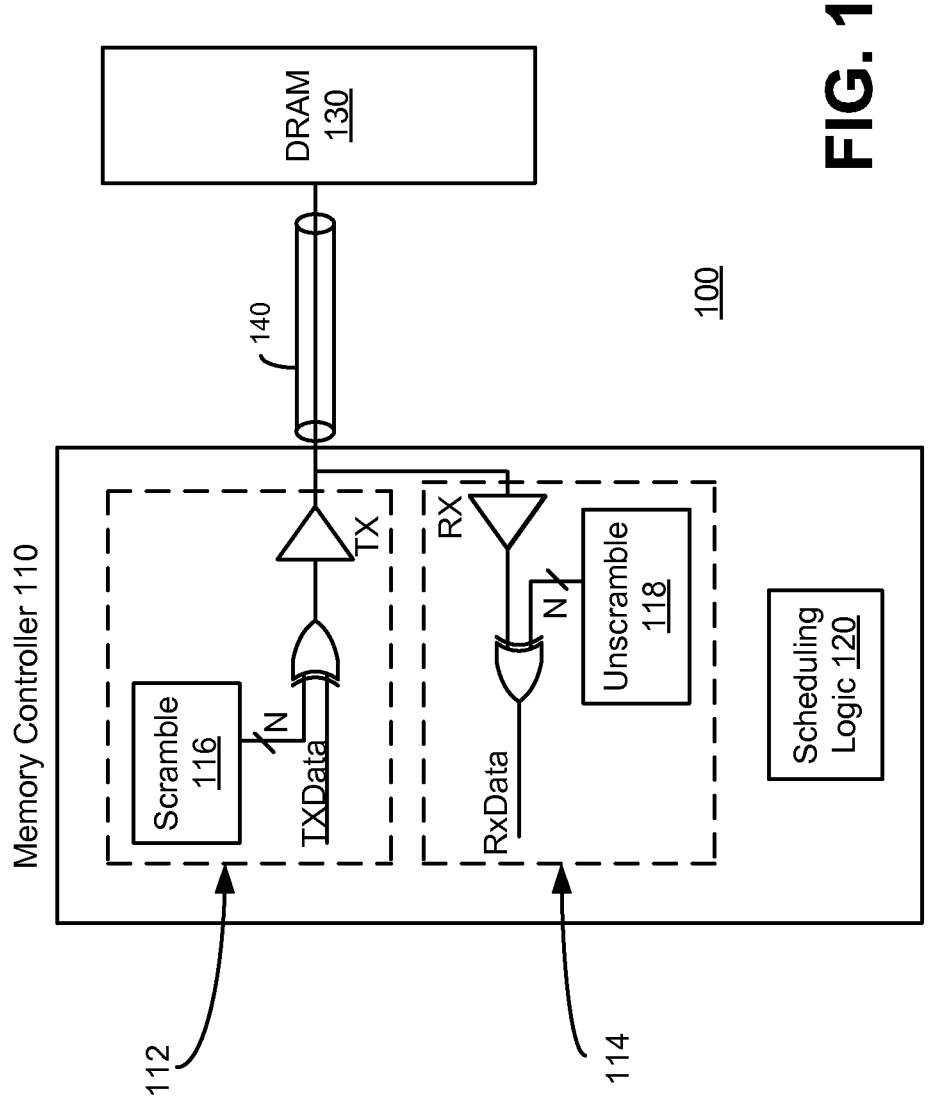
FIG. 1 is a high-level block diagram illustrating select aspects of a computing system implemented according to an embodiment.

Embodiments are generally directed to systems, methods, and apparatuses for suppressing power supply noise using data scrambling in double data rate memory systems. In some embodiments, an integrated circuit includes a transmit data path to transmit data to one or more memory devices. The transmit data path may include scrambling logic to generate, in parallel, N pseudo random outputs that are uncorrelated with each other. The output data and the pseudo random outputs are input to XOR logic. The transmit data path transmits the output the of XOR logic which has a substantially white frequency spectrum.

In the context of input/output (IO) performance, the most important power supply noise cases are package resonance and first droop. Package resonance is created by the LC tank circuit formed by the on die decap and package inductance. It generally occurs in the 100-200 MHz frequency range. Somewhat related to package resonance is first droop, which is due to the sharp current steps that are created when the IO starts or stops transmitting data. In either case, the supply noise is highly dependent on the data pattern. In the case of package resonance, the worst case occurs when the data pattern contains a significant amount of energy at the resonance frequency. In the case of first droop, the worst case occurs when all IO buffers drive in the same direction (e.g., transmit 0). Using normal data traffic, it is fairly easily to hit either one of these cases. As is further described below, embodiments suppress supply noise by scrambling data that is transmitted on the memory interconnect.

In addition to power supply noise, another advantage of scrambling is to avoid worst case patterns. Due to one or more of crosstalk, ISI (inter symbol interference) and/or supply noise, for example, I/O performance and reliability is strongly dependent on the pattern that is transmitted. In this case, data pattern refers to the particular sequence of bits that is transmitted on one or more data lanes and across one or more cycles. For example, an 8 bit bus that transmits data for 8 cycles can have $2^{64}$ unique data patterns. If each of those patterns is transmitted a large number of times, each will produce a different BER (bit error rate) in the system. By applying a strong scrambling scheme to the bus, the data on a given lane in a given cycle can be considered a discrete random variable with a probability of 0.5. This means that every possibly pattern on the bus become equally probable. With data scrambling, the probability of the system failing at a given BER is the combination of the BER of the individual patterns and the probably of that pattern happening. If a pattern requires a large number of interacting bits to hit a very high BER case, then scrambling data can make that pattern sufficiently improbable that it will not impact the overall system BER. As a result, scrambling tends to keep a system's BER close to the BER of the "average" pattern and not the "worst case" pattern.

FIG. 1 is a high-level block diagram illustrating select aspects of a computing system implemented according to an embodiment. System 100 includes memory controller 110 and dynamic random access memory (DRAM) 130 coupled together via memory interconnect 140. In some embodiments, system 100 implements, at least in part, the DDR specification. In alternative embodiments, system 100 may include more elements, fewer elements, and/or different elements.

Memory controller 110 controls the flow of information into and out of DRAM 130. In some embodiments, memory controller 110 is integrated onto the same integrated circuit as one or more processing cores. In alternative embodiments, memory controller 110 may be part of a separate integrated circuit such as a memory controller hub.

Memory controller 110 includes transmit (TX) data path 112 and receive (RX) data path 114. The TX and RX data paths enable memory controller 110 to improve I/O reliability by scrambling transmitted data in a manner that is transparent to DRAM 130. In some embodiments, scrambling logic 116 generates, in parallel, a plurality of pseudo random outputs that are uncorrelated with one another. The WR data is XOR'd with the outputs of scrambling logic 116 so that the data transmitted to DRAM 130 has a substantially pseudo random pattern. Conversely, unscramble logic 118 generates a plurality of pseudo random outputs to unscramble the read (RD) data received from DRAM 130. In some embodiments, the reliability exhibited for data transmissions over interconnect 140 is substantially increased because the transmitted data has a substantially white frequency spectrum. As shown in FIG. 1, embodiments may suppress supply noise and improve reliability on both the memory controller side and the DRAM side because the data transmitted over the memory interconnect is always scrambled. The TX and RX data paths are further discussed below with reference to FIGS. 2-5.

Figure 6:
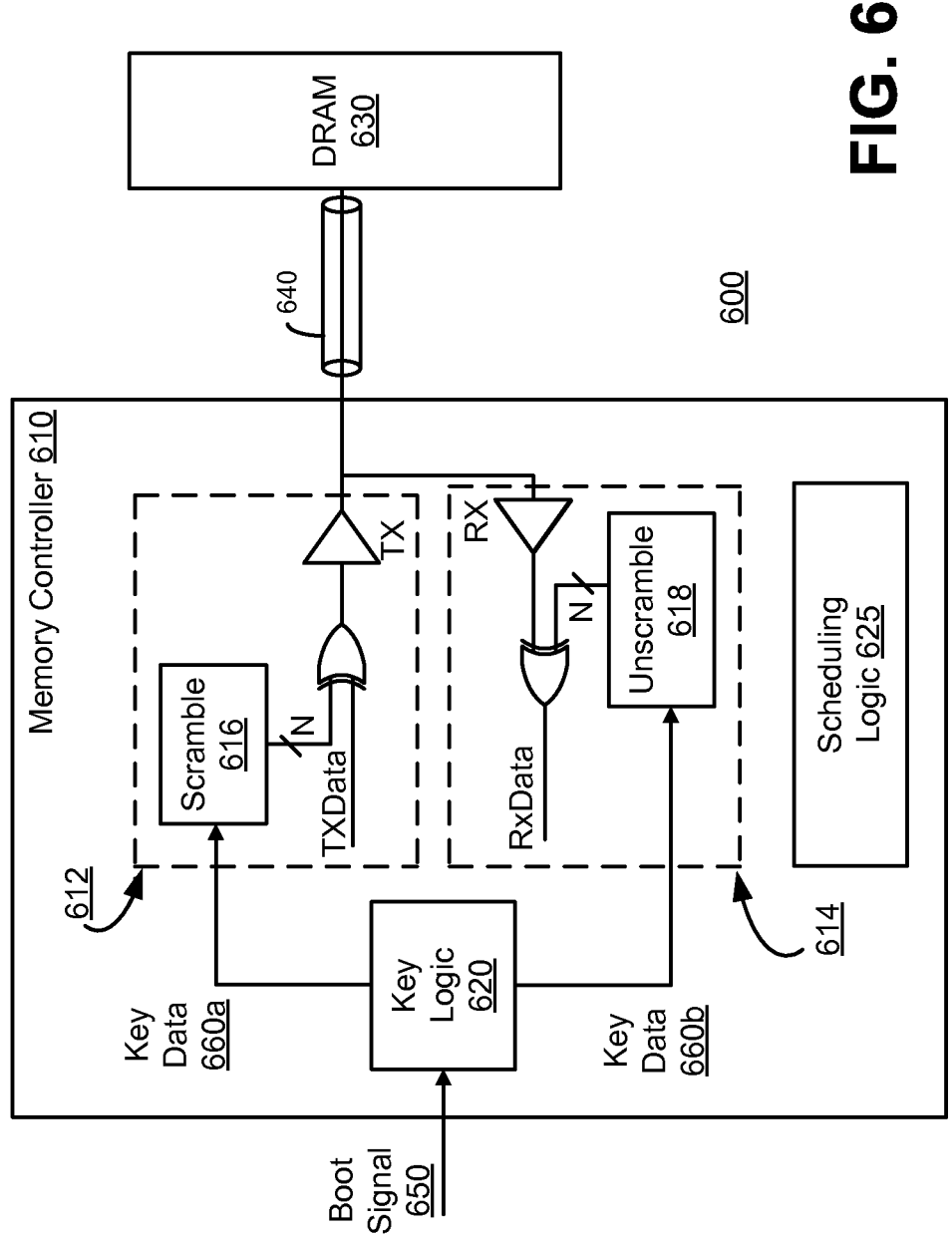
FIG. 6 is a high-level block diagram illustrating select aspects of a computing system implemented according to an embodiment.

FIG. 6 is a high-level block diagram illustrating select aspects of a system 600 to exchange data according to an embodiment. System 600 may include some combination of the features of system 100, for example. System 600 may include a memory controller 610 to control information flow into and/or out of DRAM 630, e.g. via memory interconnect 640.

Transmit (TX) data path 612 of memory controller 610 may include scrambling logic 616 to generate, in parallel, a plurality of pseudo random outputs that are uncorrelated with one another. The TX data may be XOR'd with the outputs of scrambling logic 616 so that the resulting write (WR) data transmitted to DRAM 630 has a substantially pseudo random pattern. Conversely, receive (RX) data path 614 of memory controller 610 may include unscramble logic 618 to generate another plurality of pseudo random outputs to unscramble read (RD) data received from DRAM 630.

In an embodiment, a particular characteristic of operation of scramble logic 616 and/or unscramble logic 618 may be specific to a particular instance in which a computing device enters and/or operates in a power state for implementing data exchanges with DRAM 630. For example, memory controller 610 may be part of such a computing device, where the computing device undergoes a boot-up sequence to enter a "power on" state for implementing data exchanges with DRAM 630. In response to a particular performance of such a boot-up sequence, data may be generated which is specific to that particular performance of the boot-up sequence, the data for determining how scramble logic 616 and/or operation of unscramble logic 618 is to scrambled/unscrambled data while the computer device remains in the "power on" state resulting from that particular performance of the boot-up sequence.

In an embodiment, a particular performance of a boot-up sequence results in memory controller 610 receiving a boot signal 650 including data which specific to that particular performance of the boot-up sequence. Memory controller includes key logic 620 to determine key information based at least in part on boot signal 650. For example, key data 660a may be generated and then provided to scrambling logic 616 to determine how data is to be scrambled while the computing device remains in that particular instance of a power state. Alternatively or in addition, key data 660b may be generated and then provided to unscrambling logic 618 to determine how data is to be unscrambled while the computing device remains in that particular instance of the power state. Key data 660a may be the same as or different from key data 660b, according to various embodiments. It is understood that key logic 620 may be external to memory controller 610.

Figure 2:
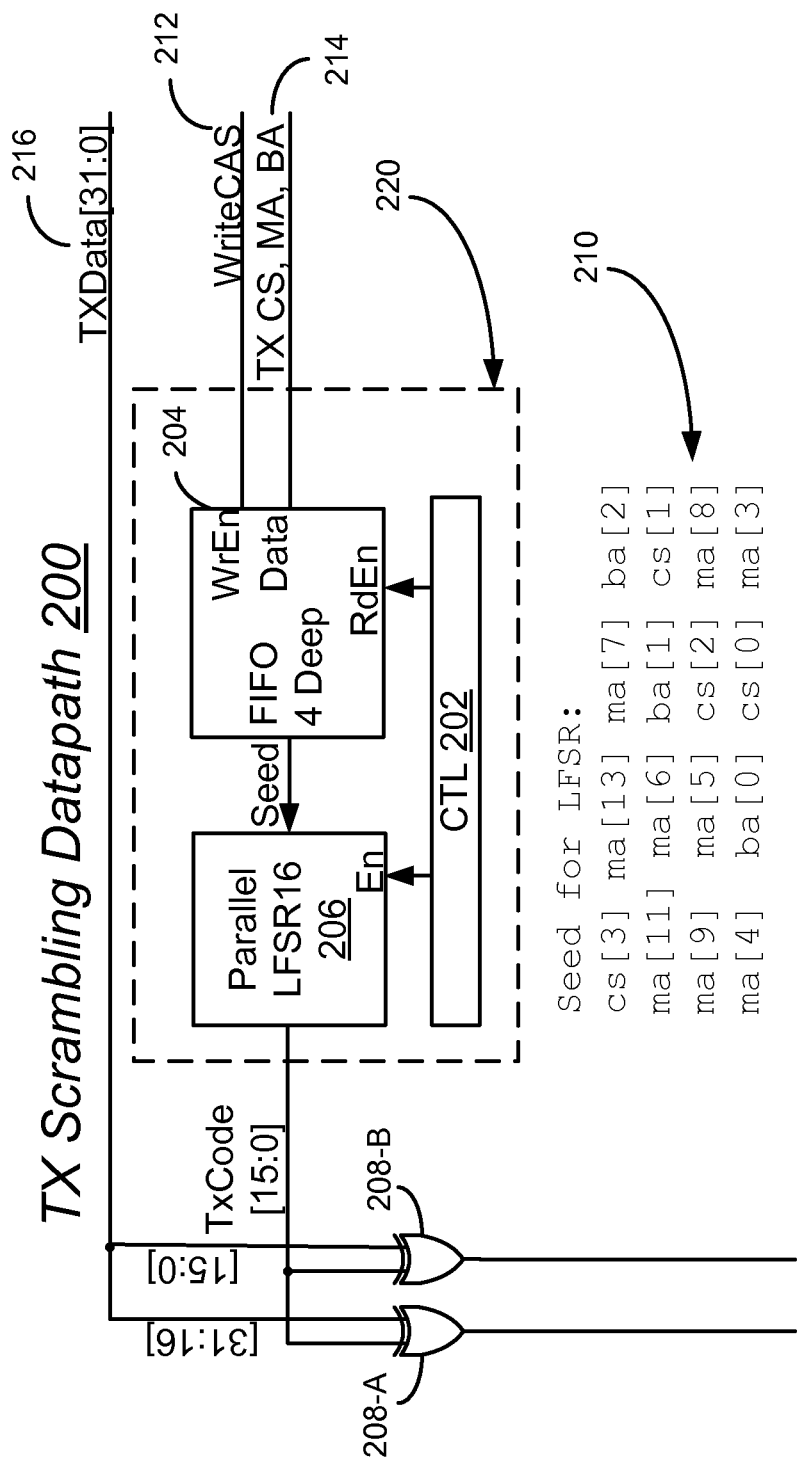
FIG. 2 is a block diagram illustrating select aspects of a transmit data path according to an embodiment.

FIG. 2 is a block diagram illustrating select aspects of a TX data path according to an embodiment. TX data path 200 includes control logic 202, FIFO (first in, first out) buffer 204, parallel linear feedback shift register (LFSR) 206, and XOR logic 208-A, 208-B. In alternative embodiments, TX data path 200 may include more elements, fewer elements, and/or different elements. For the sake of discussing certain aspects of various embodiments, reference is made herein to "scrambling means"—e.g. scrambling means 220 including control logic 202, FIFO (first in, first out) buffer 204, and parallel linear feedback shift register (LFSR) 206.

LFSR 206 creates a pseudo random pattern that is used to scramble WR data before it is sent to memory. Unlike other LFSR's which provide single bit outputs, LFSR 206 provides a parallel output of multiple bits. In the illustrated embodiment, LFSR 206 provides an output of 16 bits per cycle. In alternative embodiments, LFSR 206 may output (in parallel) a different number of bits (e.g., 8, 32, 64, etc.) per cycle. The number of cycles may depend on the number of transmissions per burst. The LFSR may also shift based on the number of transmissions per burst. For example, if a burst includes transmitting 16 "chunks" of data, then LFSR 206 may execute a shift to generate a new code for each "chunk" of data in the burst. The outputs of LFSR 206 are uncorrelated with one another. Each output is XOR'd with one or more bits of the transmit bit lanes (e.g., using XOR logic 208-A, 208-B) to "scramble" the data prior to transmitting it. Thus, the data transmitted to memory has a pseudo random pattern since the WR data is XOR'd with the pseudo random outputs of LFSR 206.

In some embodiments, LFSR 206 is initialized (or "seeded") with at least a portion of the address associated with the WR data. This simplifies the process of unscrambling the data since the same address can be used to seed an LFSR in the RX direction during a RD operation (see, e.g., FIG. 3). In the illustrated embodiment, the seed is based on the column address including, for example, the following bits: MA[13, 11, 9:4], BA[2:0], CS[7:0]. "MA" refers to memory address and is used to select a column from a row of memory. "BA" refers to the bank address and "CS" selects the rank. In alternative embodiments, the seed may be based on a different portion of the address. In yet other alternative embodiments, the seed may be based on something other than the address of the data. Reference number 210 illustrates a seed for LFSR 206 according to an embodiment.

FIFO 204 provides a buffer for multiple write column address strobes (CASs) 212. In some embodiments, each time a write CAS is issued, a portion of the write CAS is saved in FIFO 204 to provide the seed to LFSR 206 (e.g., as shown by 214). When the write data is available (e.g., on bit lanes 216), the seed is pushed to LFSR 206. The WR data and the outputs of LFSR 206 are XOR'd (e.g., using XOR logic 208-A, 208-B) to create scrambled data (e.g., data that has a substantially pseudo random pattern). A TX (e.g., TX 112, shown in FIG. 1) transmits the scrambled data to memory via an interconnect (e.g., interconnect 140, shown in FIG. 1).

Control logic 202 controls TX data path 200. For example, control logic 202 instructs FIFO 204 to load the seed at the appropriate times. In addition, control logic 202 may determine when LFRS 206 generates the pseudo random outputs. As illustrated in FIG. 2, in some embodiments, the TX data is split into two 16-bit portions and the same LFSR codes (or outputs) are used for each portion. That is, a 16 bit LFSR output may be used to scramble 32 bits of data. In alternative embodiments, the outputs of the LFSR may be reused (or not) differently.

Figure 7A:
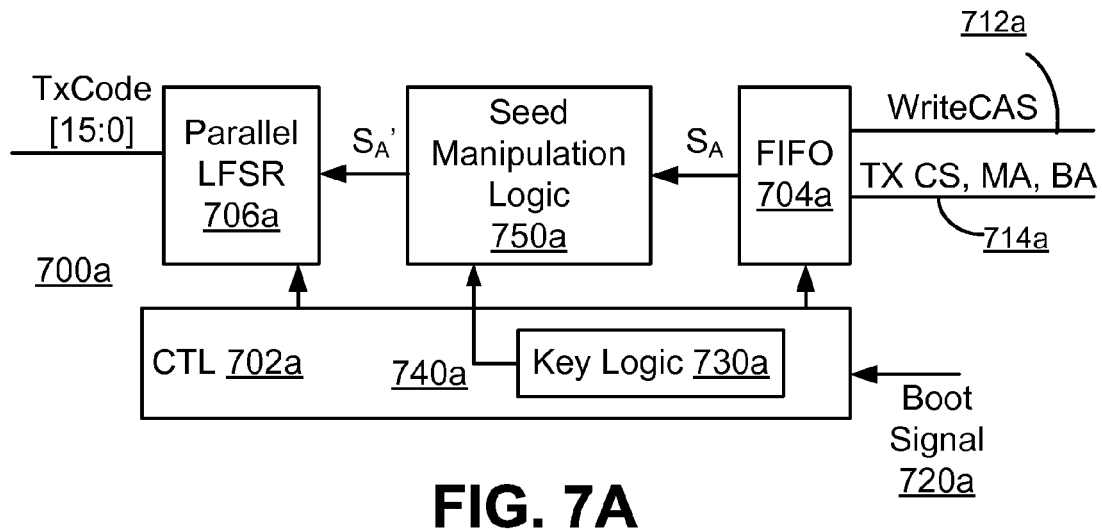
FIG. 7A is a block diagram illustrating select aspects of a transmit data path according to an embodiment.

FIG. 7A is a block diagram illustrating select aspects of scrambling means 700a according to an embodiment. Scrambling means 700a may include some or all of the features discussed above with respect to scrambling means 220, for example. An LFSR 706a of scrambling means 700a creates a pseudo random pattern that is used to scramble WR data before it is sent to memory. The outputs of LFSR 706a are uncorrelated with one another. Each output is XOR'd with one or more bits of transmit bit lanes to "scramble" data prior to transmitting it. Thus, data transmitted to memory has a pseudo random pattern since the WR data is XOR'd with the pseudo random outputs of LFSR 706a.

In some embodiments, LFSR 706a is initialized (or "seeded") based at least in part on write address information. In the illustrated embodiment, the seed is based on the column address including, for example, the following bits: MA[13, 11, 9:4], BA[2:0], CS[7:0]. In alternative embodiments, the seed may be based on a different portion of the address. FIFO 704a of scrambling means 700a provides a buffer for multiple write column address strobes (CASs) 712a. In some embodiments, each time a write CAS is issued, a portion of the write CAS is saved in FIFO 704a to provide the seed to LFSR 706a (e.g., as shown by 714a). When the write data is available, initial seed data $S_A$ is pushed to seed manipulation logic 750a of scrambling means 700a.

In some embodiments, the initializing/seeding of LFSR 706a is further based on data which is specific to a most recently preceding occurrence of a boot-up sequence for the computer system which includes scrambling means 700a. In the illustrated embodiment, control logic 702a of scrambling means 700a, which provides control for the exchange of signals in scrambling means 700a, includes key logic 730a to receive a boot signal 720a.

The boot signal 720a may be received in response to the most recent performing of a boot sequence and/or entering of an enabling power state for operation of scrambling means 700a. Boot signal 720a may, for example, include data specifying that a particular power state transition—e.g. a boot-up sequence—has occurred or is occurring. Alternatively or in addition, boot signal 720a may include a value which is generated by a random number generating logic (not shown). The value may be in response to, and therefore specific to, the most recent occurrence of a boot-up sequence. In an embodiment, key logic 730a includes logic to generate a value specific to the most recent boot-up sequence and/or associate such a value with a variable used in manipulating seed information.

In an embodiment, the key logic may provide to seed manipulation logic 750a key data 740a which represents a value—e.g. a random number value—for a variable, where the indicated value is specific to the most recent performance of a boot-up sequence. Seed manipulation logic 750a may manipulate the seed $S_A$ from FIFO 704a to generate a modified seed $S_A'$ which is provided to parallel LFSR 706a. In an embodiment, the seed manipulation logic 750a reorders a sequence of data in seed $S_A'$. Alternately or in addition, seed manipulation logic 750a may XOR key data 740a with seed $S_A$ to generate $S_A'$ prior to LFSR 706a applying an LFSR algorithm to $S_A'$.

Figure 7B:
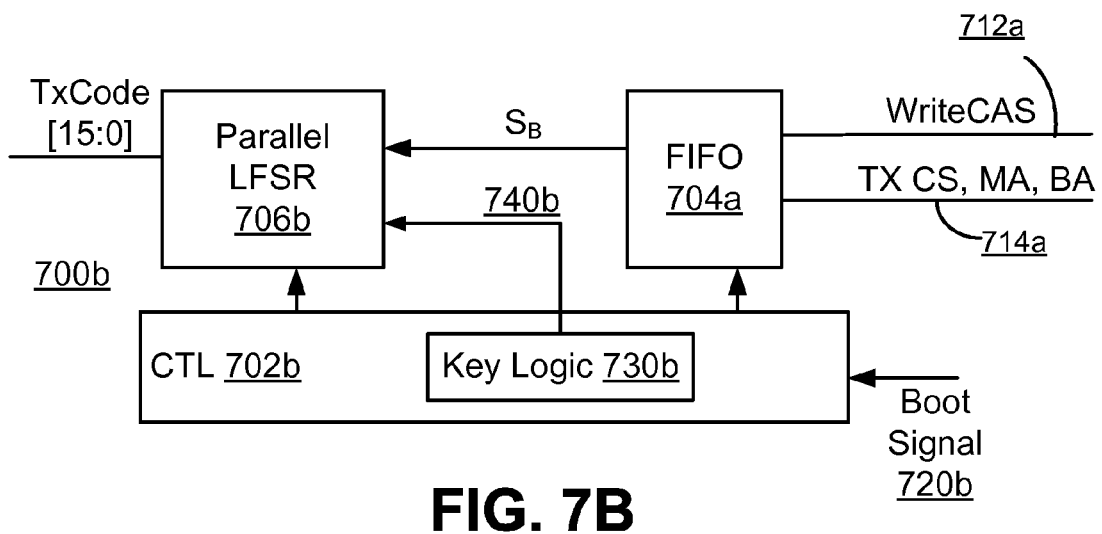
FIG. 7B is a block diagram illustrating select aspects of a transmit data path according to an embodiment.

FIG. 7B is a block diagram illustrating select aspects of scrambling means 700b according to an embodiment. Scrambling means 700b may include some or all of the features discussed above with respect to scrambling means 220, for example.

An LFSR 706b of scrambling means 700b creates a pseudo random pattern that is used to scramble WR data before it is sent to memory. The outputs of LFSR 706b are uncorrelated with one another. Each output is XOR'd with one or more bits of the transmit bit lanes to "scramble" the data prior to transmitting it. Thus, the data transmitted to memory has a pseudo random pattern since the WR data is XOR'd with the pseudo random outputs of LFSR 706b. In some embodiments, LFSR 706b is initialized (or "seeded") based at least in part on write address information. Buffering write address information 712a, 712b by FIFO 704a of scrambling means 700b to provide for such seeding may be similar to that described above with respect to FIG. 7A, for example. When write data is available, seed data $S_B$ is pushed from FIFO 704a to LFSR 706b.

In some embodiments, the operation of LFSR 706b may be further based on data which is specific to a most recently preceding occurrence of a boot-up sequence for the computer system which includes scrambling means 700b. In the illustrated embodiment, control logic 702b of scrambling means 700b, which provides control for the exchange of signals in scrambling means 700a, includes key logic 730b to receive a boot signal 720b.

The boot signal 720b may be received in response to the most recent performing of a boot sequence and/or entering of an enabling power state for operation of scrambling means 700b. Boot signal 720b may, for example, include data specifying that a particular power state transition—e.g. a boot-up sequence—has occurred or is occurring. Alternatively or in addition, boot signal 720b may include a value which is generated by a random number generating logic (not shown). The value may be in response to, and therefore specific to, the most recent occurrence of a boot-up sequence. In an embodiment, key logic 730b includes logic to generate a value specific to the most recent boot-up sequence and/or associate such a value with a variable used in manipulating seed information.

In an embodiment, the key logic 730b may provide to LFSR 706b key data 740b which represents a value—e.g. a random number value—for a variable, where the indicated value is specific to the most recent performance of a boot-up sequence. LFSR 706b may operate on seed $S_B$ in a manner which is based on key data 740b. By way of illustration and not limitation, LFSR 706b may identify a particular LFSR algorithm to apply to seed $S_B$, the identifying based on key data 740b. For example, key data 740b may itself provide a key for selecting or generating a particular LFSR polynomial for LFSR 706b.

It is understood that LFSR techniques described herein illustrate one of many possible ways to a generate pseudo-random sequence, according to various embodiments. For example, there are many other methods that use linear and/or non-linear transforms that take an N bit input and generate an M bit pseudo-random output. Techniques described herein, to change a particular LFSR algorithm based on a random number, may be extended to additionally or alternatively change any of a variety of algorithms for generating a pseudo random sequence.

Figure 3:
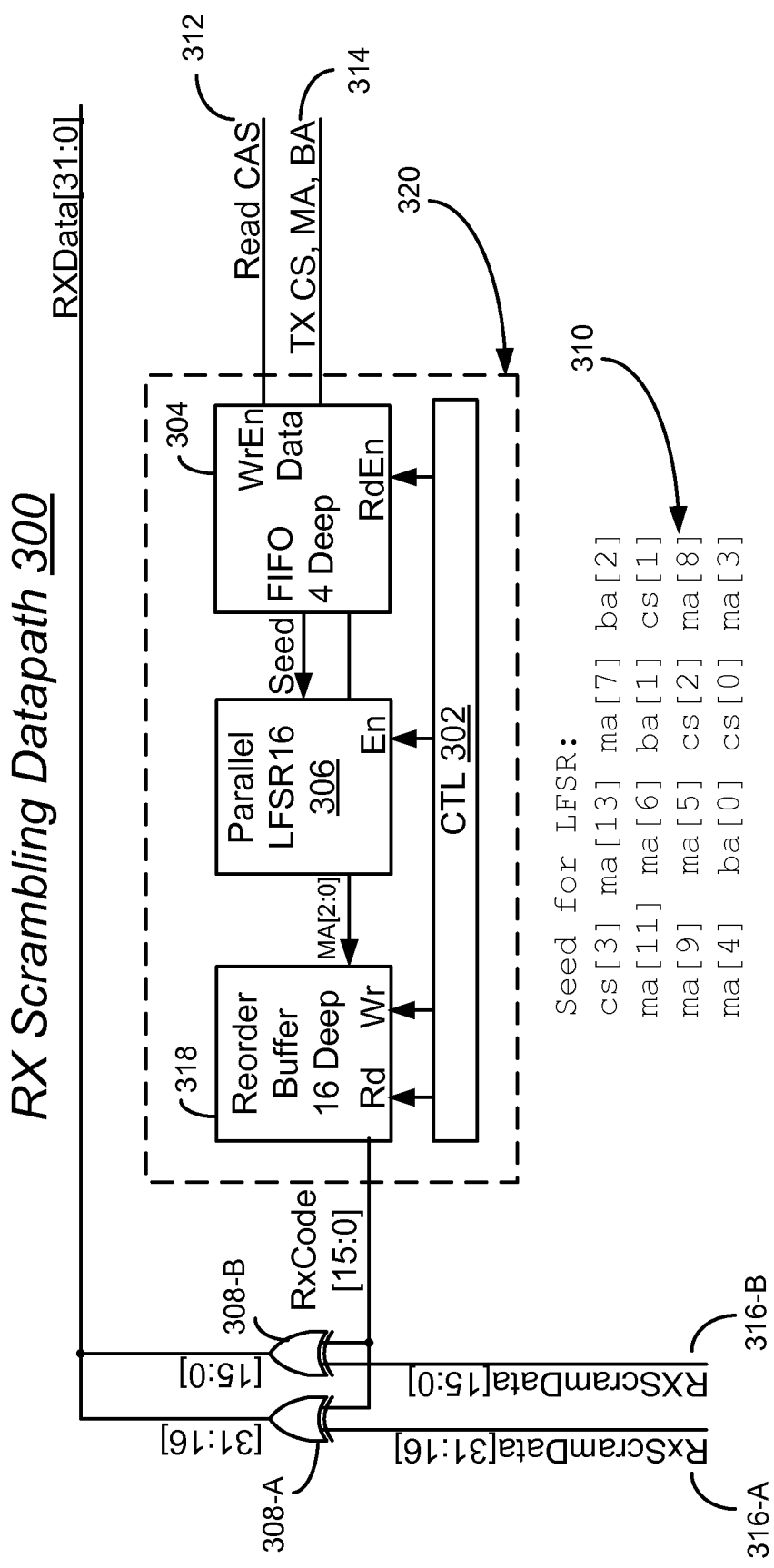
FIG. 3 is a block diagram illustrating select aspects of a receive data path according to an embodiment.

FIG. 3 is a block diagram illustrating select aspects of a receive data path according to an embodiment. RX data path 300 includes control logic 302, FIFO buffer 304, parallel LFSR 306, reorder buffer 318, and XOR logic 308a, 308b. In alternative embodiments, RX data path 300 may include more elements, fewer elements, and/or different elements.

For the sake of discussing certain aspects of various embodiments, reference is made herein to "unscrambling means"—e.g. unscrambling means 320 including control logic 302, FIFO buffer 304, parallel LFSR 306 and reorder buffer 318.

LFSR 306 creates a pseudo random pattern that is used to unscramble RD data that is received from memory. LFSR 306 provides a parallel output of multiple uncorrelated bits. In the illustrated embodiment, LFSR 306 provides an output of 16 bits per cycle. In alternative embodiments, LFSR 306 may output (in parallel) a different number of bits (e.g., 8, 32, 64, etc.) per cycle. The outputs of LFSR 306 are uncorrelated with one another. Each output is XOR'd with one or more bits of the RX lanes (e.g., using XOR logic 308a, 308b) to "unscramble" the data received from memory.

In some embodiments, LFSR 306 is seeded with at least a portion of the address associated with the RD data. In the illustrated embodiment, the seed is based on the column address including, for example, the following bits: MA[13, 11, 9:4], BA[2:0], CS[7:0]. In alternative embodiments, the seed may be based on a different portion of the address. In yet other alternative embodiments, the seed may be based on something other than the address of the data. Reference number 310 illustrates a seed for LFSR 306 according to an embodiment.

FIFO 304 provides a buffer for multiple RD column address strobes (CASs) 312. In some embodiments, each time a RD CAS is issued, a portion of the RD CAS is saved in FIFO 304 to provide the seed to LFSR 306 (e.g., as shown by 314). When the RD data is available (e.g., on bit lanes 316-A, 316-B), the seed is pushed to LFSR 306. The RD data and the outputs of LFSR 306 are XOR'd (e.g., using XOR logic 308a, 308b) to create scrambled data (e.g., data that has a substantially pseudo random pattern).

The DDR Specification supports out of order data reads. Thus, data that is read back from memory may not be received in the same order that it is transmitted to memory. In some embodiments, RX data path 300 includes reorder buffer 318 to reorder the pseudo random codes that are generated from the LFSR to match the order in which data is actually received. The RD CAS may include information that indicates the order in which data is going to be read. For example, bits MA [2:0] may indicate the order of the RD data. In some embodiment, the unscramble codes are pre-calculated and stored in reorder buffer 318. Reorder buffer 318 may alter the order of the codes so that they match the order of the RD data. The RD data may then be properly unscrambled by the reordered codes. In alternative embodiments, a different mechanism may be used to match the codes with RD data that is received in a different order than it was transmitted.

Control logic 302 controls RX data path 300. For example, control logic 302 instructs FIFO 304 to load the seed at the appropriate times. In addition, control logic 302 may determine when LFRS 306 generates the pseudo random outputs. Control logic 302 may also control the operation of reorder buffer 318.

Figure 8A:
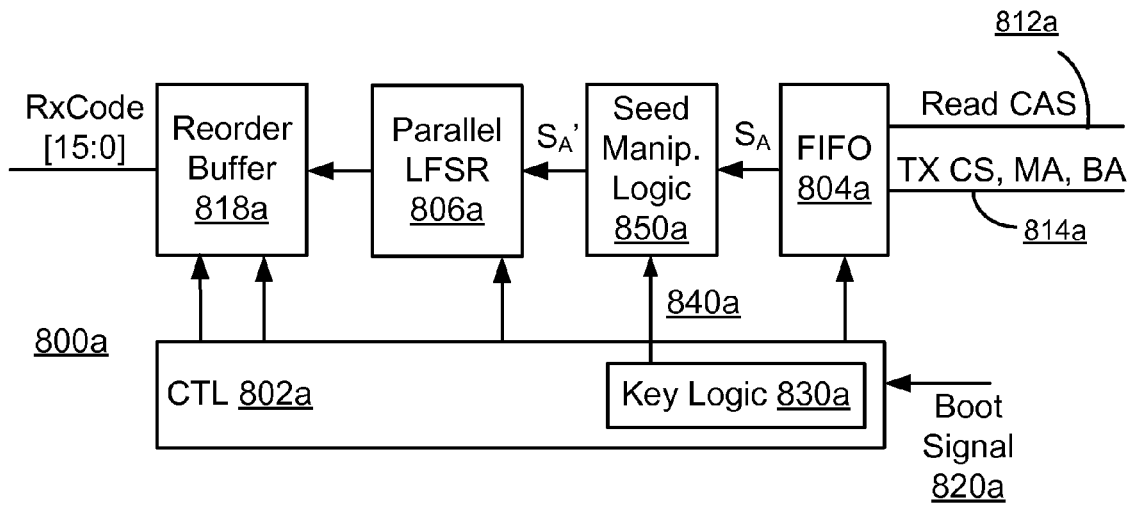
FIG. 8A is a block diagram illustrating select aspects of a receive data path according to an embodiment.

FIG. 8A is a block diagram illustrating select aspects of an unscrambling means 800a according to an embodiment. Unscrambling means 800a includes control logic 802a, FIFO buffer 804a, parallel LFSR 806a and reorder buffer 818a. In alternative embodiments, unscrambling means 800a may include more elements, fewer elements, and/or different elements. Unscrambling means 800a may include some or all of the features discussed herein with respect to unscrambling means 320, for example.

LFSR 806a creates a pseudo random pattern that is used to unscramble RD data that is received from memory. LFSR 806a provides a parallel output of multiple uncorrelated bits. In the illustrated embodiment, LFSR 806a provides an output of 16 bits per cycle. In alternative embodiments, LFSR 806a may output (in parallel) a different number of bits (e.g., 8, 82, 64, etc.) per cycle. The outputs of LFSR 806a are uncorrelated with one another. Each output is XOR'd with one or more bits of the RX lanes to "unscramble" the data received from memory.

In some embodiments, LFSR 806a is seeded with at least a portion of the address associated with the RD data. In the illustrated embodiment, the seed is based on the column address including, for example, the following bits: MA[13, 11, 9:4], BA[2:0], CS[7:0]. In alternative embodiments, the seed may be based on a different portion of the address. In yet other alternative embodiments, the seed may be based on something other than the address of the data. $S_A$ illustrates a seed for LFSR 806a according to an embodiment.

FIFO 804a provides a buffer for multiple RD column address strobes (CASs) 812. In some embodiments, each time a RD CAS is issued, a portion of the RD CAS is saved in FIFO 804a to provide the seed to LFSR 806a (e.g., as shown by 814). When the RD data is available, initial seed data $S_A$ is pushed to seed manipulation logic 850a of scrambling means 800a.

In some embodiments, the initializing/seeding of LFSR 806a is further based on data which is specific to a most recently preceding occurrence of a boot-up sequence for the computer system which includes unscrambling means 800a. In the illustrated embodiment, control logic 802a, which provides control for the exchange of signals in scrambling means 800a, includes key logic 830a to receive a boot signal 820a. Similar to features discussed above, key logic 830a includes logic to generate a value e.g. a random number value—specific to the most recent boot-up sequence and/or associate such a value with a variable used in manipulating seed information.

In an embodiment, the key logic 830a may provide to seed manipulation logic 850a key data 840a which represents a value—e.g. a random number value—for a variable, where the indicated value is specific to the most recent performance of a boot-up sequence. Seed manipulation logic 850a may manipulate the seed $S_A$ from FIFO 804a to generate a modified seed $S_A'$ for parallel LFSR 806a. In an embodiment, the seed manipulation logic 850a reorders a sequence of data in seed $S_A$ to create a modified seed data $S_A'$ for parallel LFSR 806a. Alternately or in addition, seed manipulation logic 850a may XOR key data 840a with seed $S_A$ prior to LFSR 806a applying an LFSR algorithm to the resulting modified seed $S_A'$. Parallel LFSR 806a may then provide outputs to reorder buffer 818a—e.g. according to techniques described herein with respect to FIG. 3.

Figure 8B:
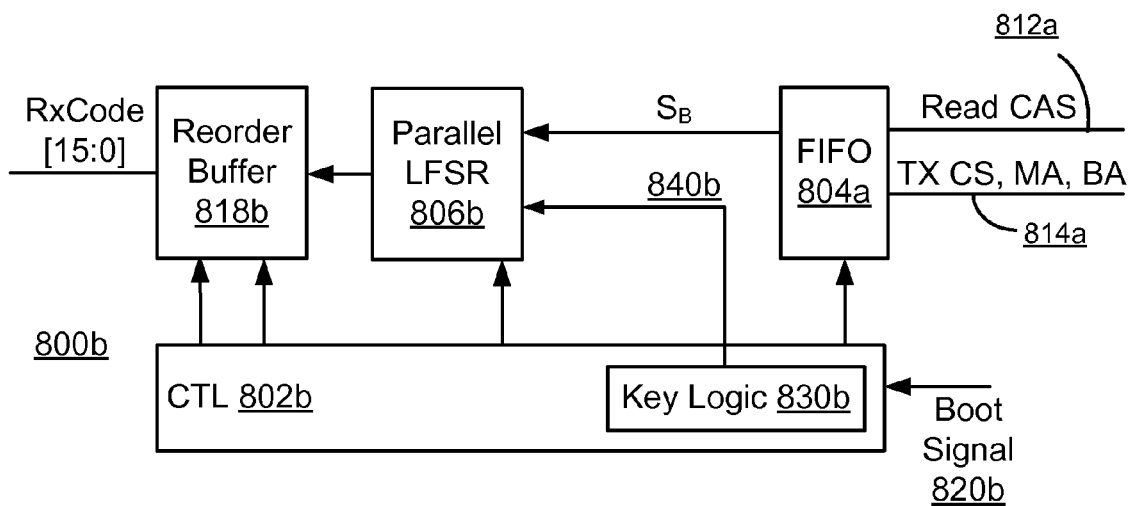
FIG. 8B is a block diagram illustrating select aspects of a receive data path according to an embodiment.

FIG. 8B is a block diagram illustrating select aspects of an unscrambling means 800b according to an embodiment. Unscrambling means 800b may include some or all of the features discussed herein with respect to unscrambling means 320, for example.

LFSR 806b similarly creates a pseudo random pattern that is used to unscramble RD data that is received from memory. The outputs of LFSR 806b are uncorrelated with one another. Each output is XOR'd with one or more bits of the RX lanes to "unscramble" the data received from memory. In some embodiments, LFSR 806b is seeded with at least a portion of the address associated with the RD data. Buffering read address information 812a, 814a by FIFO 804a of scrambling means 800b to provide for such seeding may be similar to that described above with respect to FIG. 8A, for example.

In some embodiments, the initializing/seeding of LFSR 806b is further based on data which is specific to a most recently preceding occurrence of a boot-up sequence for the computer system which includes unscrambling means 800b. In the illustrated embodiment, control logic 802b, which provides control for the exchange of signals in scrambling means 800b, includes key logic 830b to receive a boot signal 820b. Similar to features discussed above, key logic 830b includes logic to generate a value e.g. a random number value—specific to the most recent boot-up sequence and/or associate such a value with a variable used in manipulating seed information.

Techniques for generating a random number may include, for example, hardware-based random number generator circuitry—e.g. incorporated into an integrated circuit. Alternatively or in addition, input from an analog circuit may be used for generating one or more numbers, where lower order bits of the one or more numbers show significant random components. Examples of such analog input may include, for example, measurements of an eye width/height of an I/O system, and/or thermal sensor measurements.

LFSR 806b may operate on seed $S_B$ in a manner which is based on the provided key data 840b. By way of illustration and not limitation, LFSR 806b may identify a particular LFSR algorithm to apply to seed $S_B$, the identifying based on key data 840b. For example, key data 840b may itself provide a key for selecting or generating a particular LFSR polynomial for LFSR 806b. Alternatively or in addition, data from the LFSR may be XOR'd with the random key before it is looped back into the LFSR. Parallel LFSR 806b may then provide an output to reorder buffer 818b—e.g. according to techniques described herein with respect to FIG. 3.

FIG. 4 is a conceptual diagram illustrating select aspects of a scrambling (or unscrambling) process based on a parallel linear feedback shift register (LFSR) implemented according to an embodiment. Each row of table 400 illustrates the logic for calculating the output of an LFSR (e.g., LFSR 206 shown in FIG. 2 and LFSR 306 shown in FIG. 3). In some embodiments, the LFSR implements the polynomial: $X^{16}+X^{13}+X^{10}+X^9+X^8+X^4+1$. For example, referring to row 2, the output N+1 of bit 2 is determined by the following expression: $Out_{N+1}[2]=Out_N[2]+Out_N[5]+Out_N[8]+Out_N[9]+Out_N[A]+Out_N[E]$. In alternative embodiments, the LFSR may implement different polynomials and/or different logic.

The effectiveness of scrambling was analyzed using MATLAB for 1333 MTs (mega transfers per second) DDR with extracted power delivery models. Table 1 (shown below) summarizes the results for both first droop and package resonance. For continuous data streams, scrambling largely eliminated supply noise. These results, however, degraded substantially when gaps were added to the data transmission. The worst case occurred when the gaps corresponded to the resonance frequency of the power delivery network. Smaller or larger gaps produced less noise since they were further away from the resonance frequency. Even with these gaps, however, scrambling still reduced the worst case supply noise by an impressive 45%.

TABLE 1

|  | 1st Droop Peak 2 Peak | | Resonance Pattern Peak 2 Peak | |
|---|---|---|---|---|
|  | Clear | Scrambled | Clear | Scrambled |
| 6.0 nS Data/0 nS Gap | 479 mV | 107 mV | 485 mV | 66 mV |
| 6.0 nS Data/1.5 nS Gap | 509 mV | 222 mV | 486 mV | 231 mV |
| 6.0 nS Data/3.0 nS Gap | 357 mV | 245 mV | 348 mV | 271 mV |
| 6.0 nS Data/4.5 nS Gap | 205 mV | 150 mV | 137 mV | 152 mV |
| Worst Case | 509 mV | 245 mV | 486 mV | 271 mV |
| Noise Reduction | Baseline | 52 | Baseline | 45 |

Figure 5:
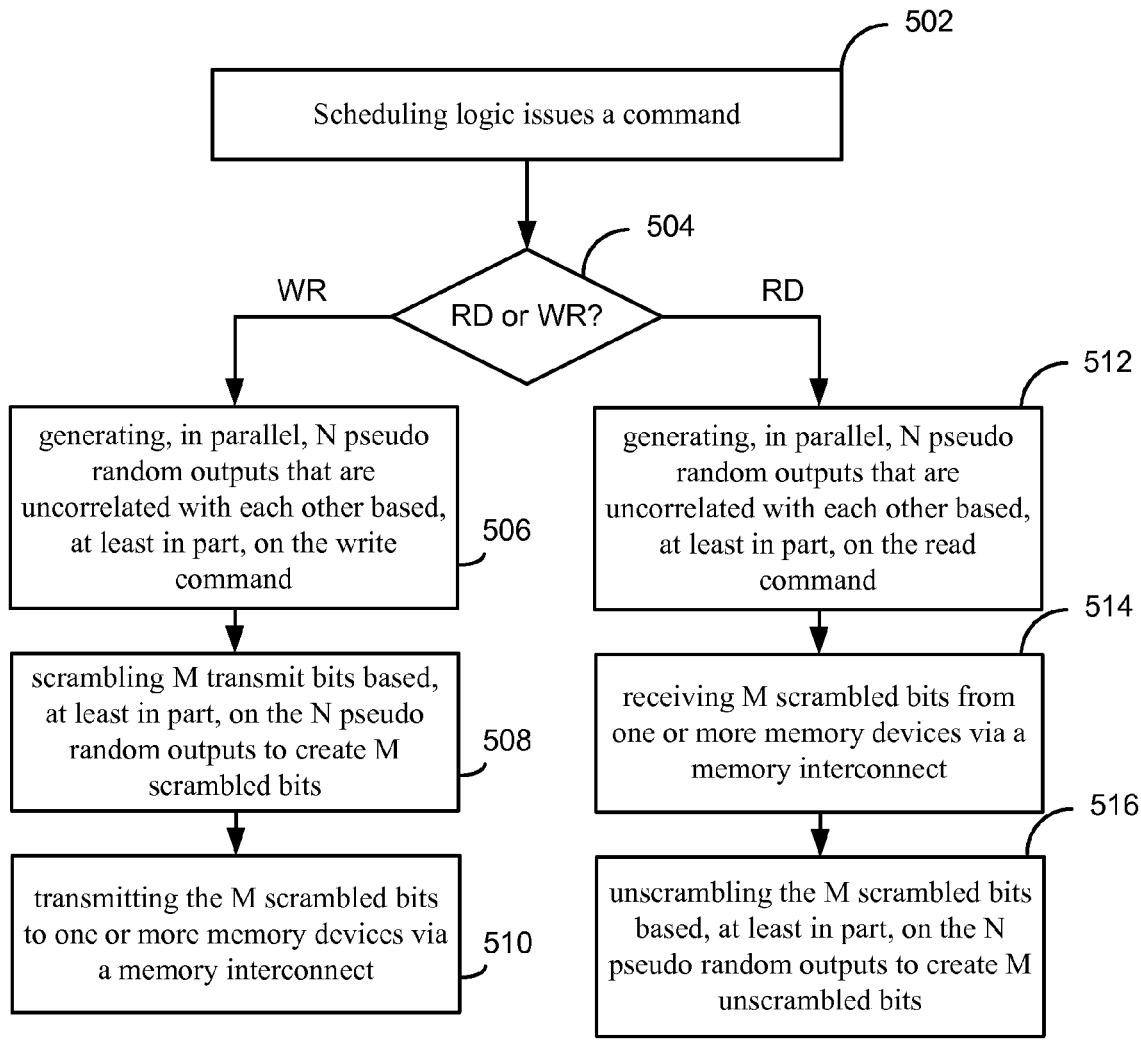
FIG. 5 is a flow diagram illustrating select aspects of a method for suppressing power supply noise using data scrambling according to an embodiment.

FIG. 5 is a flow diagram illustrating select aspects of a method for suppressing power supply noise using data scrambling according to an embodiment. Referring to process block 502, scheduling logic (e.g., scheduling logic 120, shown in FIG. 1) issues a command. The command may be any of a number of different types of commands including, for example, a RD command or a WR command as shown by 502.

If the command is a WR command, then scrambling logic in the WR data path generates, in parallel, N pseudo random outputs that are uncorrelated with each other at 506. In some embodiments, the N pseudo random outputs are based, at least in part, on the WR command. For example, the scrambling logic may include a parallel LFSR and a portion of the WR CAS command may be used to seed the LFSR.

Referring to process block 508, M TX bits are scrambled by N pseudo random outputs. In some embodiments, M is 32 and N is 16. In alternative embodiments, M and/or N may have different values. In some embodiments, the M TX bits are "scrambled" by XOR'ing them with the N pseudo random outputs. The LFSR may shift once per burst of data and a different N (e.g., 16) bit code may be used for each chunk of data in a burst.

Referring to process block 510, the M scrambled bits are transmitted to one or more memory devices via a memory interconnect. In some embodiments, the M scrambled bits have a white frequency spectrum. That is, the energy at any frequency is substantially the same. On average, half of the received scrambled bits are logical highs and half of the received scrambled bits are logical lows. The scramble and transmit process may be repeated until all of the entire burst of data is sent.

If the issued command is a RD command, then scrambling logic in the RD data path generates, in parallel, N pseudo random outputs that are uncorrelated with each other at 512. In some embodiments, the N pseudo random outputs are based, at least in part, on the RD command. For example, the scrambling logic may include a parallel LFSR and a portion of the RD CAS command may be used to seed the LFSR.

Referring to process block 514, the M scrambled bits are received from one or more memory devices via the memory interconnect. The received scrambled bits, like the transmitted scrambled bits have a white frequency spectrum. On average, half of the received scrambled bits are logical highs and half of the received scrambled bits are logical lows.

Referring to process block 516, M RD bits are unscrambled by the N pseudo random outputs. In some embodiments, M is 32 and N is 16. In alternative embodiments, M and/or N may have different values. In some embodiments, the M RD bits are "unscrambled" by XOR'ing them with the N pseudo random outputs. The LFSR may shift once per burst of data and a different N (e.g., 16) bit code may be used for each chunk of data in a burst.

Embodiments do not affect the performance of error correction codes (ECCs). In fact, embodiments may actually enhance ECC coverage by protecting against transmission errors on the command interconnect. For example, if a RD address is corrupted by a transmission error on the command interconnect, then the wrong data will be returned to the memory controller. The data will be unscrambled using the "wrong" seed (e.g., based on the correct RD address) and this will flag an ECC error.

Figure 9:
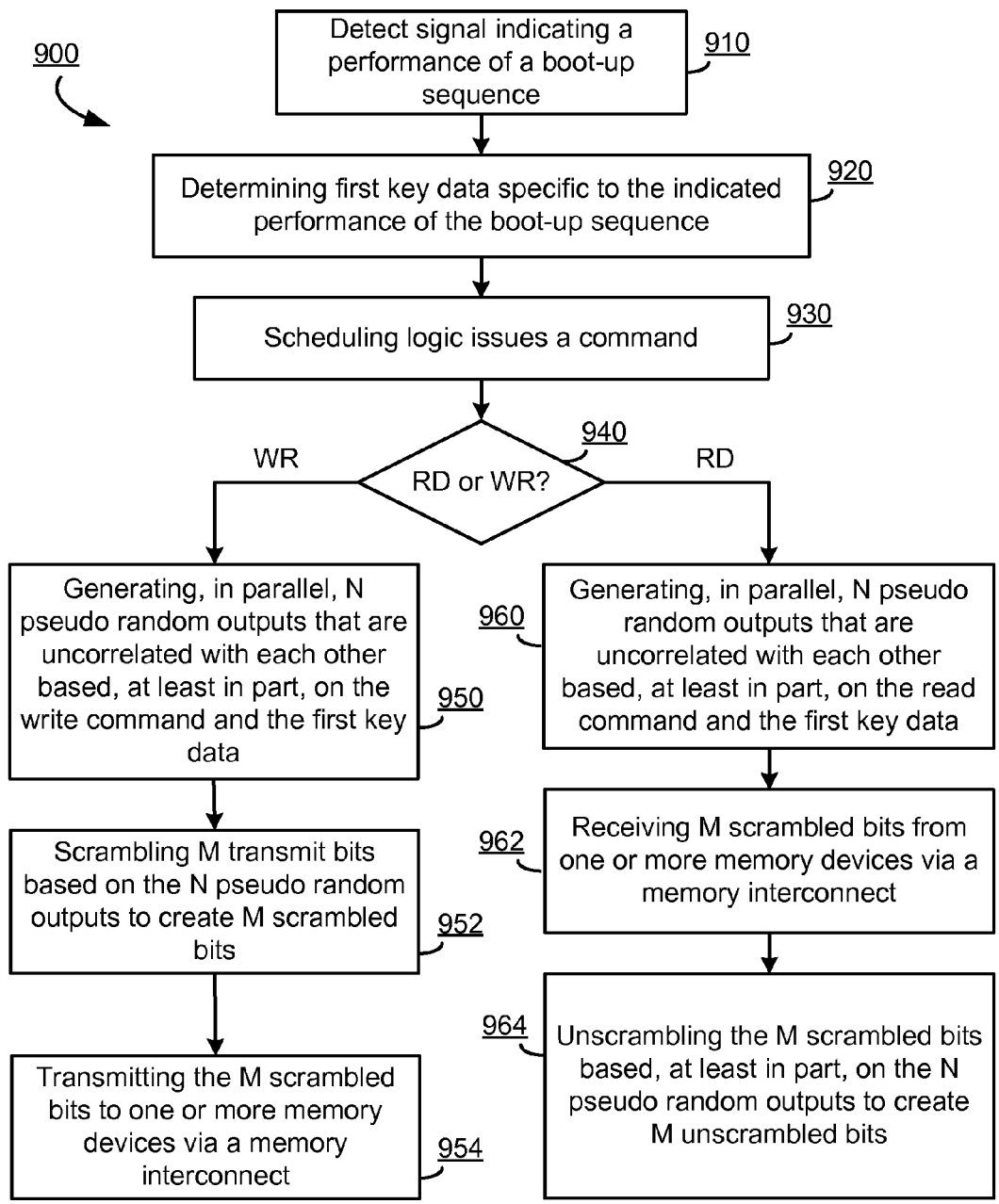
FIG. 9 is a flow diagram illustrating select aspects of a method for suppressing power supply noise using data scrambling according to an embodiment.

FIG. 9 is a flow diagram illustrating select aspects of a method 900 for suppressing power supply noise using data scrambling according to an embodiment. In an embodiment, some or all of method 900 may be performed by memory controller 610, for example.

Referring to process block 910, a signal is detected indicating a particular performance of a boot-up sequence. Such a signal may include, for example, one of the various boot signals described herein. The signal may specify that a particular power state transition—e.g. a boot-up—has occurred or is occurring. Alternatively or in addition, the signal may identify that a value has been generated, where an associating of the particular value to a variable is specific to the particular boot-up sequence. For example, the particular value may be associated with the variable for only as long as the device in question remains in its current powered up state.

Referring to process block 920, key data logic determines first key data specific to the indicated performance of the boot-up sequence. Determining the first key data may include identifying such first key data in the detected signal. Alternatively, determining such first key data may include generating a random number value in response to detecting from the signal that a boot-up sequence has occurred (or is occurring).

Referring to process block 930, scheduling logic (e.g., scheduling logic 625, shown in FIG. 6) issues a command. The command may be any of a number of different types of commands including, for example, a RD command or a WR command as shown by 940.

If the command is a WR command, then scrambling logic in the WR data path generates, in parallel, N pseudo random outputs that are uncorrelated with each other at 950. In some embodiments, the N pseudo random outputs are based, at least in part, on the WR command. For example, the scrambling logic may include a parallel LFSR and a portion of the WR CAS command may be used to seed the LFSR.

In an embodiment, the generating N pseudo random outputs is also based on the first key data. For example, WR command address information may be operated on based on the first key data to generate the N pseudo random outputs— as described, for example, with respect to FIG. 7A. Alternately or in addition, a particular scrambling technique to be applied to a seed may be determined based on the first key data—as described, for example, with respect to FIG. 7B.

Referring to process block 952, M transmit bits are scrambled based on the N pseudo random outputs to create M scrambled bits. In some embodiments, M is 32 and N is 16. In alternative embodiments, M and/or N may have different values. In some embodiments, the M TX bits are "scrambled" by XOR'ing them with the N pseudo random outputs. The LFSR may shift once per burst of data and a different N (e.g., 16) bit code may be used for each chunk of data in a burst.

Referring to process block 954, the M scrambled bits are transmitted to one or more memory devices via a memory interconnect. In some embodiments, the M scrambled bits have a white frequency spectrum. That is, the energy at any frequency is substantially the same. On average, half of the received scrambled bits are logical highs and half of the received scrambled bits are logical lows. The scramble and transmit process may be repeated until the entire burst of data is sent.

However, if at 940 the issued command is a RD command, then scrambling logic in the RD data path generates, in parallel, N pseudo random outputs that are uncorrelated with each other at 960. In some embodiments, the N pseudo random outputs are based, at least in part, on the RD command. For example, the scrambling logic may include a parallel LFSR and a portion of the RD CAS command may be used to seed the LFSR.

In an embodiment, the generating N pseudo random outputs is also based on the first key data. For example, RD command address information may be operated on based on the first key data to generate the N pseudo random outputs— as described, for example, with respect to FIG. 8A. Alternately or in addition, a particular scrambling technique to be applied to a seed may be determined based on the first key data—as described, for example, with respect to FIG. 8B.

Referring to process block 962, M scrambled bits are received from one or more memory devices via the memory interconnect. The received scrambled bits, like the transmitted scrambled bits have a white frequency spectrum. On average, half of the received scrambled bits are logical highs and half of the received scrambled bits are logical lows.

Referring to process block 964, M RD bits are unscrambled by the N pseudo random outputs. In some embodiments, M is 32 and N is 16. In alternative embodiments, M and/or N may have different values. In some embodiments, the M RD bits are "unscrambled" by XOR'ing them with the N pseudo random outputs. The LFSR may shift once per burst of data and a different N (e.g., 16) bit code may be used for each chunk of data in a burst.

By changing the random key every boot (or on some other periodic basis), we are able to better achieve the overall goal of creating a strong scrambling scheme that cannot easily be defeated either accidentally or by some form of malicious application. It should also be noted that the key should be considered a secret that is must be protected from such malicious applications.

Elements of certain embodiments may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the description above, certain terminology is used to describe embodiments. For example, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a micro-controller, or the like.

It should be appreciated that reference throughout this specification to "one embodiment" or "an embodiment" means that a particular feature, structure or characteristic described in connection with the embodiment is included in at least one embodiment. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

Similarly, it should be appreciated that in the foregoing description of embodiments, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. An integrated circuit comprising:
key logic to detect a signal indicating an occurrence of a boot-up sequence comprising a plurality of read and write operations and to generate first key data in response to detecting the signal, the first key data specific to the occurrence of the boot-up sequence and for use during the read and write operations of the boot-up sequence;
a transmit data path to transmit data to one or more memory devices during the write operations of the boot-up sequence, the transmit data path including,
scrambling logic to generate, in parallel and during the write operations of the boot-up sequence, N pseudo random outputs that are uncorrelated with each other, the generating the N pseudo random outputs based on the first key data,
XOR logic having as a first input the N pseudo random outputs of the scrambling logic and having as a second input M data bits, the XOR logic to output, in parallel, M scrambled bits, and
a transmitter coupled with the XOR logic, the transmitter to transmit the M scrambled bits to the one or more memory devices via a memory interconnect, wherein the M scrambled bits have a substantially pseudo random pattern; and
a receive data path to receive data from the one or more memory devices during the read operations of the boot-up sequence, the receive data path including,
a receiver to receive, in parallel, M scrambled bits from the memory interconnect,
unscrambling logic to generate, in parallel and during the read operations of the boot-up sequence, N pseudo random outputs that are uncorrelated with each other, the generating the N pseudo random outputs by the unscrambling logic based on the first key data, and
XOR logic having as a first input the M scrambled bits from the memory interconnect and having as a second input the N pseudo random outputs of the unscrambling logic, the XOR logic to output, in parallel, M unscrambled bits.

2. The integrated circuit of claim 1, wherein the scrambling logic comprises a parallel linear feedback shift register (LFSR), and wherein the scrambling logic to generate the N pseudo random outputs based on the first key data includes the scrambling logic to determine a polynomial for the linear feedback shift register based on the first key data.

3. The integrated circuit of claim 1, wherein the scrambling logic comprises a parallel linear feedback shift register (LFSR), and wherein a seed for the parallel LFSR is based on the first key data and a memory address associated with the M scrambled bits.

4. The integrated circuit of claim 3, wherein the seed for the parallel LFSR is based on a scrambling of memory address data, the scrambling based on the first key data.

5. The integrated circuit of claim 1, wherein the scrambling logic comprises a parallel linear feedback shift register (LFSR), and wherein the scrambling logic to generate N pseudo random outputs includes the scrambling logic to XOR data from the LFSR with the first key data to create a result which is input back into the LFSR.

6. The integrated circuit of claim 1, wherein the unscrambling logic comprises a parallel linear feedback shift register (LFSR).

7. The integrated circuit of claim 6, wherein a seed for the parallel LFSR is based, at least in part, on a column address associated with the M scrambled bits.

8. The integrated circuit of claim 6, wherein the parallel LFSR is to be seeded at the beginning of each read burst.

9. A method comprising:
detecting a signal indicating an occurrence of a boot-up sequence comprising a plurality of read and write operations;
generating first key data in response to detecting the signal, the first key data specific to the occurrence of the boot-up sequence and for use during the read and write operations of the boot-up sequence;
during the write operations of the boot-up sequence, issuing a write command to instruct a transmit data path to write a burst of data to memory;
based on the first key data and the write command, generating, in parallel and during the write operations of the boot-up sequence, N pseudo random outputs that are uncorrelated with each other;
scrambling M transmit bits based, at least in part, on the N pseudo random outputs to create M scrambled bits;
transmitting the M scrambled bits to one or more memory devices via a memory interconnect;
during the read operations of the boot-up sequence, issuing a read command to instruct a receive data path to read a burst of data from memory;
generating, in parallel and during the read operations of the boot-up sequence, N pseudo random outputs that are uncorrelated with each other based, at least in part, on the read command and the first key data;
receiving M scrambled bits from one or more memory devices via a memory interconnect; and
unscrambling the M scrambled bits based, at least in part, on the N pseudo random outputs to create M unscrambled bits.

10. The method of claim 9, wherein the scrambling logic comprises a parallel linear feedback shift register (LFSR), and wherein the scrambling logic to generate the N pseudo random outputs based on the first key data includes the scrambling logic to determine a polynomial for the linear feedback shift register based on the first key data.

11. The method of claim 9, wherein the scrambling logic comprises a parallel linear feedback shift register (LFSR), and wherein a seed for the parallel LFSR is based on the first key data and a memory address associated with the M scrambled bits.

12. The method of claim 11, wherein the seed for the parallel LFSR is based on a reordering of memory address data, the reordering based on the first key data.

13. A system comprising:
one or more dynamic random access memory devices (DRAMs); and
an integrated circuit coupled with the one or more DRAMs via a memory interconnect, the integrated circuit having:
key logic to detect a signal indicating an occurrence of a boot-up sequence comprising a plurality of read and write operations, the key logic and to generate first key data in response to detecting the signal, the first key data specific to the occurrence of the boot-up sequence and for use during the read and write operations of the boot-up sequence;

a transmit data path to transmit data to one or more memory devices during the write operations of the boot-up sequence, the transmit data path including:
  scrambling logic to generate, in parallel and during the write operations of the boot-up sequence, N pseudo random outputs that are uncorrelated with each other, the generating the N pseudo random outputs based on the first key data, and
  XOR logic having as a first input the N pseudo random outputs of the scrambling logic and having as a second input M data bits, the XOR logic to output, in parallel, M scrambled bits to be transmitted to a memory device; and
a receive data path to receive data from the one or more memory devices during the read operations of the boot-up sequence, the receive data path including:
  a receiver to receive, in parallel, M scrambled bits from the memory interconnect,
  unscrambling logic to generate, in parallel and during the read operations of the boot-up sequence, N pseudo random outputs that are uncorrelated with each other, the generating the N pseudo random outputs by the unscrambling logic based on the first key data, and
  XOR logic having as a first input the M scrambled bits from the memory interconnect and having as a second input the N pseudo random outputs of the unscrambling logic, the XOR logic to output, in parallel, M unscrambled bits.

14. The system of claim 13, wherein the scrambling logic comprises a parallel linear feedback shift register (LFSR), and wherein the scrambling logic to generate the N pseudo random outputs based on the first key data includes the scrambling logic to determine a polynomial for the linear feedback shift register based on the first key data.

15. The system of claim 13, wherein the scrambling logic comprises a parallel linear feedback shift register (LFSR), and wherein the scrambling logic to generate N pseudo random outputs includes the scrambling logic to XOR data from the LFSR with the first key data to create a result which is input back into the LFSR.

16. The system of claim 13, wherein the unscrambling logic comprises a parallel linear feedback shift register (LFSR), wherein a seed for the parallel LFSR is based, at least in part, on a column address associated with the M scrambled bits.

17. The system of claim 16, wherein the parallel LFSR is to be seeded at the beginning of each read burst.

* * * * *